United States Patent
Abe et al.

(10) Patent No.: US 7,299,499 B2
(45) Date of Patent: Nov. 20, 2007

(54) DATA TRANSFER SYSTEM, DATA TRANSFER APPARATUS, DATA RECORDING APPARATUS, DATA TRANSFER METHOD, AND RECORDING MEDIUM

(75) Inventors: Miki Abe, Kanagawa (JP); Tadao Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 903 days.

(21) Appl. No.: 10/005,012

(22) Filed: Dec. 4, 2001

(65) Prior Publication Data

US 2002/0107595 A1    Aug. 8, 2002

(30) Foreign Application Priority Data

Dec. 5, 2000   (JP)  .............................. 2000-374698

(51) Int. Cl.
    *H04L 9/32*   (2006.01)
(52) U.S. Cl. ........................... 726/26; 380/201; 700/94
(58) Field of Classification Search ................ 380/201; 726/26; 700/94
    See application file for complete search history.

(56) References Cited

U.S. PATENT DOCUMENTS

| | | | | |
|---|---|---|---|---|
| 5,050,011 | A * | 9/1991 | Endoh ........................... | 360/60 |
| 5,636,276 | A * | 6/1997 | Brugger ........................ | 705/54 |
| 5,764,607 | A * | 6/1998 | Maeda et al. ............. | 369/47.12 |
| 5,765,152 | A * | 6/1998 | Erickson ........................ | 707/9 |
| 5,805,551 | A * | 9/1998 | Oshima et al. ................ | 705/57 |
| 5,820,384 | A * | 10/1998 | Tubman et al. .............. | 434/308 |
| 5,867,579 | A * | 2/1999 | Saito ............................. | 705/57 |
| 5,881,038 | A * | 3/1999 | Oshima et al. ........... | 369/47.12 |
| 5,887,060 | A * | 3/1999 | Ronning ........................ | 705/52 |
| 5,889,860 | A * | 3/1999 | Eller et al. ................... | 713/202 |
| 5,966,440 | A * | 10/1999 | Hair ............................. | 705/26 |
| 5,991,876 | A * | 11/1999 | Johnson et al. .............. | 713/200 |
| 6,034,832 | A * | 3/2000 | Ichimura et al. .............. | 360/60 |
| 6,061,451 | A * | 5/2000 | Muratani et al. ........... | 380/201 |
| 6,438,692 | B2 * | 8/2002 | Kato et al. ................... | 713/176 |
| 6,449,717 | B1 * | 9/2002 | Saito ........................... | 713/161 |
| 6,469,239 | B1 * | 10/2002 | Fukuda ........................ | 84/602 |
| 6,480,607 | B1 * | 11/2002 | Kori et al. ................... | 380/201 |
| 6,515,212 | B2 * | 2/2003 | Taira et al. ................... | 84/609 |
| 6,518,891 | B2 * | 2/2003 | Tsutsui et al. ................ | 341/50 |

(Continued)

OTHER PUBLICATIONS

Patent Abstracts of Japan, JP 2000 099010 A (Nippon Telegraph & Telephone Corp) Apr. 7, 2007.

(Continued)

*Primary Examiner*—Nasser Moazzami
*Assistant Examiner*—David Garcia Cervetti
(74) *Attorney, Agent, or Firm*—Finnegan, Henderson, Farabow, Garrett & Dunner, L.L.P.

(57) ABSTRACT

A SDMI-compliant portable medium and a non-SDMI-compliant portable medium can be selectively connected to a licensed compliant module. When transferring copyright-protected encrypted content data from the licensed compliant module, whether the destination of transfer is the SDMI-compliant portable medium or the non-SDMI-compliant medium is determined. When the destination is found to be the SDMI-compliant portable medium, the number of times the encrypted content data can be transferred is restricted. When the destination is found to be the non-SDMI-compliant portable medium, the return (or check-in) of the encrypted content data from the non-SDMI-compliant portable medium to the licensed compliant module is disabled.

25 Claims, 9 Drawing Sheets

U.S. PATENT DOCUMENTS

| | | | |
|---|---|---|---|
| 6,529,506 B1* | 3/2003 | Yamamoto et al. | 370/389 |
| 6,564,253 B1* | 5/2003 | Stebbings | 380/201 |
| 6,591,365 B1* | 7/2003 | Cookson | 713/176 |
| 6,618,808 B1* | 9/2003 | Johnson et al. | 713/200 |
| 6,643,085 B2* | 11/2003 | Shirai et al. | 360/60 |
| 6,668,158 B1* | 12/2003 | Tsutsui et al. | 455/12.1 |
| 6,675,179 B2* | 1/2004 | Morohashi | 707/204 |
| 6,687,802 B1* | 2/2004 | Kori et al. | 711/163 |
| 6,697,944 B1* | 2/2004 | Jones et al. | 713/168 |
| 6,701,436 B1* | 3/2004 | Hirai | 713/176 |
| 6,721,437 B1* | 4/2004 | Ezaki et al. | 382/100 |
| 6,735,311 B1* | 5/2004 | Rump et al. | 380/231 |
| 6,735,699 B1* | 5/2004 | Sasaki et al. | 713/200 |
| 6,765,599 B2* | 7/2004 | Nagai et al. | 345/520 |
| 6,775,215 B2* | 8/2004 | Kobayashi et al. | 369/53.21 |
| 6,782,190 B1* | 8/2004 | Morito | 386/94 |
| 6,785,815 B1* | 8/2004 | Serret-Avila et al. | 713/176 |
| 6,789,106 B2* | 9/2004 | Eyer et al. | 709/205 |
| 6,789,188 B1* | 9/2004 | Epstein et al. | 713/155 |
| 6,802,004 B1* | 10/2004 | Gross et al. | 713/176 |
| 6,807,024 B1* | 10/2004 | Yokota et al. | 360/60 |
| 6,807,534 B1* | 10/2004 | Erickson | 705/51 |
| 6,810,200 B1* | 10/2004 | Aoyama et al. | 386/94 |
| 6,834,111 B1* | 12/2004 | Nishimura et al. | 380/255 |
| 6,834,348 B1* | 12/2004 | Tagawa et al. | 713/193 |
| 6,845,450 B1* | 1/2005 | Kobayashi et al. | 726/5 |
| 6,847,950 B1* | 1/2005 | Kamibayashi et al. | 705/57 |
| 6,859,790 B1* | 2/2005 | Nonaka et al. | 705/51 |
| 6,865,552 B1* | 3/2005 | Inoue et al. | 705/57 |
| 6,950,941 B1* | 9/2005 | Lee et al. | 713/193 |
| 6,961,854 B2* | 11/2005 | Serret-Avila et al. | 713/176 |
| 7,035,827 B2* | 4/2006 | Ezaki | 705/51 |
| 7,054,839 B2* | 5/2006 | Iima et al. | 705/52 |
| 7,054,840 B1* | 5/2006 | Foth et al. | 705/57 |
| 7,096,504 B1* | 8/2006 | Tagawa et al. | 726/27 |
| 7,107,452 B2* | 9/2006 | Serret-Avila et al. | 713/176 |
| 7,137,012 B1* | 11/2006 | Kamibayashi et al. | 713/193 |
| 7,164,767 B2* | 1/2007 | Abe et al. | 380/269 |
| 7,181,008 B1* | 2/2007 | Kamibayashi et al. | 380/22 |
| 2001/0047481 A1* | 11/2001 | Inoha et al. | 713/200 |
| 2001/0053223 A1* | 12/2001 | Ishibashi et al. | 380/231 |
| 2002/0054281 A1* | 5/2002 | Ishizaka | 380/201 |
| 2002/0057799 A1* | 5/2002 | Kohno | 380/228 |
| 2002/0064281 A1* | 5/2002 | Ishizaka | 380/201 |
| 2002/0113722 A1* | 8/2002 | Inokuchi et al. | 341/50 |
| 2002/0169971 A1* | 11/2002 | Asano et al. | 713/193 |

OTHER PUBLICATIONS

Patent Abstract of Japan, JP 07334080 A (Nippon Telegraph & Telephone Corp) Dec. 22, 1995.

"SDMI Secure Digital Music Initiative," SDMI Portable Device Specification Version 1.0, Part 1, Jul. 8, 1999, pp. 1-35.

Frank Hartung, et al., "Digital Rights Management and Watermarking of Multimedia Content for M-Commerce Applications," IEEE Communications Magazine, Nov. 2000, vol. 38, No. 11.

"Against SDMI," retrieved from Internet: http://ganges.cs.tcd.ie/undergrad/4ba2.01/group10/againstSDMI.html, Nov. 28, 2000.

European Search Report for Application No. 01310110.0-2223, dated Jul. 21, 2006.

* cited by examiner

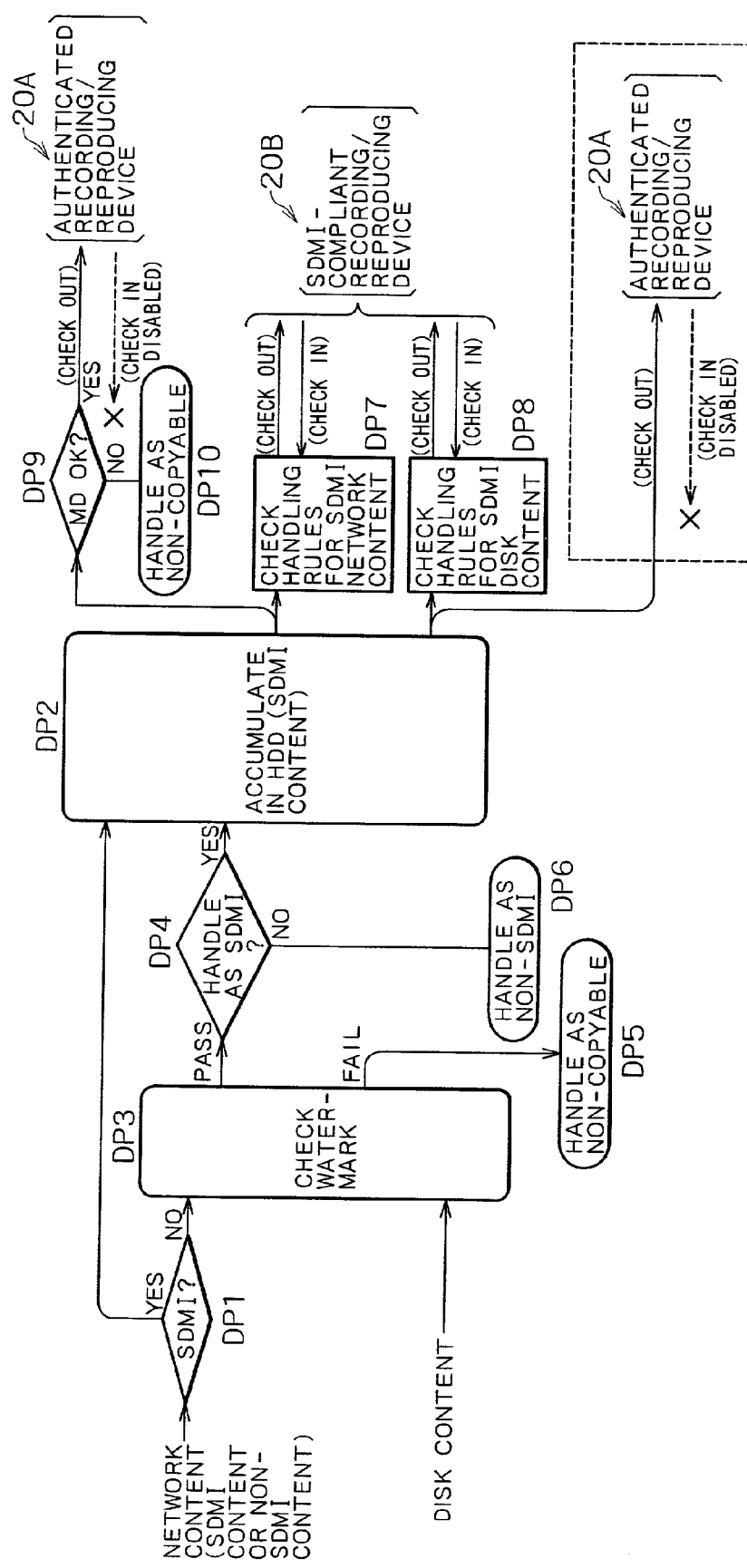

DATA TRANSFER SYSTEM, DATA TRANSFER APPARATUS, DATA RECORDING APPARATUS, DATA TRANSFER METHOD, AND RECORDING MEDIUM

BACKGROUND OF THE INVENTION

The present invention relates to a data transfer system, data transfer apparatus, a data recording apparatus, a data transfer method, and a recording medium which are suitable for transfer and recording of content data such as music to be copyright protected.

For example, content data such as music are stored in a hard disk drive (hereafter referred to as a HDD), the recording medium, of a personal computer, the stored content data are transferred to another recording medium (the secondary recording medium), and the content data are reproduced from this secondary recording medium.

In this case, the HDD stores content data such as music reproduced from a package medium such as CD-DA (Compact Disk Digital Audio) and DVD (Digital Versatile Disk) or content data downloaded from an external music server for example via a communication network to which the personal computer is connected. The user of the personal computer connects a recording apparatus for the secondary recording medium to the personal computer, copies or moves the content data from the HDD to the secondary recording medium, and reproduces the content data such as music through a reproducing apparatus compatible with the secondary recording medium.

The secondary recording medium may be a memory card based on a semiconductor memory such as a flash memory, a Mini Disc (trademark), a CD-R (CD Recordable), a CD-RW (CD Rewritable), a DVD-RAM, a DVD-R, or a DVD-RW, which is a magneto-optical disk.

Recorders/players capable of recording and/or playing these recording media are in wide use as recording/reproducing apparatuses compatible with the secondary recording medium. These recorders/players are various in type; stationary type, portable type, and so on. Users can record/playback content data in accordance with their preference and the types of their apparatuses.

Given the above-mentioned content data usage forms, the copyright protection of these content data must be taken into consideration. For example, if users can store content data into the HDD of their personal computers by downloading the content data through content data distribution services or from purchased package media and then copy the stored content data without restriction to secondary recording media, a problem of copyright violation occurs. To overcome this problem to maintain the copyright protection in the handling of content data as digital data, various technological and data handling standards have been proposed. One of them is SDMI (Secure Digital Music Initiative).

FIG. 1 illustrates a data path formulated by SDMI. It should be noted that, in a personal computer having a HDD as the primary recording medium, this data path stores and transfers music content to external devices (on the secondary recording medium side). In other words, this data path is implemented by an installed software program which stores and/or transfers music content. The procedures and processing on the data path shown in FIG. 1 are denoted by references DP21 through DP28. In what follows, these references are used for corresponding descriptions.

The software installed in the personal computer having the HDD determines whether the content data distributed by an external server via a network (hereafter referred to as network content) are based on SDMI for copyright protection (DP21).

The network content to be distributed includes the content data which are transmitted by the server side as SDMI-compliant content (hereafter referred to as SDMI-compliant content) and content data which are not associated with SDMI (hereafter referred to as non-SDMI content).

With the SDMI-compliant content, the content data are encrypted by content key CK based on DES (Data Encryption Standard) for example. The content data themselves are originally encoded by a compression algorithm such as ATRAC3 (Adaptive Transform Acoustic Coding 3) or MP3 (Moving Picture Experts Group ½ Layer 3), which are then encrypted for distribution.

It should be noted that, for the convenience of description, data y encrypted by key x are represented as E(x, y).

For the encrypted data E(x, y), the data decrypted by key x are represented as D{x, E(x, y)}.

Therefore, if the compressed data based on ATRAC3 is represented as A3D, then the SDMI-compliant content to be encrypted by key CK for distribution is represented as E(CK, A3D).

If the distributed network content is SDMI-compliant, it is stored in the primary recording medium such as the HDD as SDMI content (DP21 and DP22).

In this case, the content data are written to the HDD in the state of encrypted E(CK, A3D). Alternatively, the content data are decrypted and then encrypted by another key CK', namely encryption keys are changed, and then the newly encrypted content data are written to the HDD in the state of E(CK', A3D).

On the other hand, if the network content is non-SDMI content, then watermark check, namely screening by electronic watermark is executed (DP21 to DP23).

Further, direct watermark check is executed (DP23) on the content data read from package media such as CD-DA and DVD for example (hereafter referred to as disk content) which are reproduced on a disk drive device such as the CD-ROM drive installed on the personal computer or on a disk drive device connected to the personal computer for example.

Namely, watermark check is executed on the content data not based on SDMI.

If the watermark-checked content data are found no good, the content data are copy-disabled on the SDMI data path (DP23 to DP25). Specific handling of copy disablement depends on the software design. For example, the content data may be stored in the HDD but may not be transferred for copying or moving to other recording media or the content data may not be stored in the HDD in the processing of SDMI-compliant content.

If the content data have passed watermark check, namely if a watermark is found in the content data and a control bit indicates the permission of copy, then the content data are found rightfully copyable. Next, whether or not the content data are to be handled on the basis of SDMI is determined (DP24). Whether or not to handle these content data as compliant with SDMI may be determined by the software design or user setting.

If the content data are not handled as compliant with SDMI, then the content data are regarded as non-SDMI content and excluded from the content data path compliant with SDMI (DP26). For example, these content data may be transferred to recording apparatuses which are not compatible with SDMI.

On the other hand, if the content data are to be handled as compliant with SDMI, then these content data are encrypted and stored in the HDD as SDMI content (DP24 to DP22). For example, these content data are stored in the form of E(CK, A3D) or E(CK', A3D).

The above-mentioned data path stores, in the primary recording medium such as HDD, the content handled as compliant with SDMI obtained via a network (hereafter referred to as SDMI network content) and the content handled as compliant with SDMI retrieved from a disk such as CD-DA (hereafter referred to as SDMI disk content).

The SDMI content (SDMI network content or SDMI disk content) stored in the HDD is transferred to a recording/reproducing apparatus compliant with SDMI to be copyable to the secondary recording medium compliant with SDMI. The recording/reproducing apparatus compliant with SDMI is a portable recorder/player based on memory card for example, which is compatible with the encryption based on SDMI.

In the case of SDMI disk content, a transfer handling rule (or a usage rule) corresponding to SDMI disk content is defined, on the basis of which the transfer for copy to an SDMI-compliant recording/reproducing is authorized (DP28).

It should be noted that the transfer for copy from the primary recording medium (HDD) to the secondary recording medium (memory card for example) which is recorded and reproduced by an SDMI-compliant recording/reproducing apparatus is referred to as "checkout." The transfer for move from the secondary recording medium to the primary recording medium is referred to as "check-in." It should be noted that the move from the secondary recording medium to the primary recording medium deletes the transferred content data from the secondary recording medium.

The rules of transferring SDMI disk content may define a checkout upper limit count that each piece of content data can be checked out a maximum of three times for example. Therefore, SDMI disk content can be copied up to three SDMI-compliant secondary recording media for example. If a checkout takes place, the checkout count of the content data managed in the personal computer having the HDD is decremented. Consequently, even after the copying to three SDMI-compliant secondary recording media, if content data are checked in from one of these secondary recording media to the primary recording medium (HDD), the checkout count of content data managed in the personal computer is incremented by one. As a result, the content is made copyable once again from the primary recording medium (HDD) to an SDMI-compliant secondary recording medium. Namely, content data are allowed to exist always on up to three SDMI-compliant secondary recording media.

In the case of SDMI network content, a transfer handling rule (usage rule) corresponding to SDMI network content is also defined, on the basis of which the transfer for copy to an SDMI-compliant recording/reproducing apparatus is authorized (DP27).

This transfer handling rule specifies the upper limit of checkout count for example as with the rule for SDMI disk content. The upper limit count may be the same as or different from the rule for SDMI disk content. For example, the upper limit checkout count may be one. In this case, one piece of content data can be copied to only another one SDMI-compliant secondary recording medium; however, if content data are checked in from that secondary recording medium, the content data can be transferred for copy again.

When SDMI content is transferred for copy to an SDMI-compliant secondary recording medium in accordance with these handling rules, the content data are transmitted as encrypted on a transmission path. Namely, the content data are transmitted in the above-mentioned state of E(CK, A3D) or E(CK', A3D).

Further, on the SDMI-compliant recording/reproducing apparatus which has received the encrypted SDMI content, the received SDMI content is copied to the secondary recording medium as encrypted.

If the SDMI-compliant recording/reproducing apparatus reproduces the SDMI content from the secondary recording medium, the content data read from the secondary recording medium are decrypted. Namely, the content data copied to the secondary recording medium in the state of E(CK, A3D) or E(CK', A3D) are decrypted by key CK or key CK'.

More specifically, the original content data are restored as the ATRAC3 data (A3D) decrypted as D{CK, E(CK, A3D)}=A3D or D{CK', E(CK', A3D)}=A3D. The decrypted content data are then decompressed from ATRAC3 compression to be demodulated as audio data for example, which are reproduced as music.

According to the SDMI-compliant data path, the encrypted content data are transmitted from a server on the network to a secondary recording medium and the copying of these content data is controlled by predetermined rules, so that the copyright of the content data can be properly protected.

However, the following drawbacks may occur from the copying of content data to SDMI-compliant secondary recording media.

Assume here that a Mini Disc (a kind of magneto-optical disk) currently in wide use be used as the secondary recording medium.

For example, if an SDMI-compliant Mini Disc recording apparatus is used, this Mini Disc recording apparatus records checked out SDMI content to a Mini Disc in the encrypted state of E(CK, A3D) or E(CK', A3D).

In reproduction, ATRAC3 data (A3D) decrypted as D{CK, E(CK, A3D)}=A3D or D{CK', E(CK', A3D)}=A3D must be obtained to be decoded in a predetermined manner, the result, music for example, being outputted for reproduction.

Currently popular Mini Disc systems cannot record encrypted data to Mini Discs. Obviously, no Mini Disc reproducing device has a decoder for decrypting encrypted data.

If, in the future, an SDMI-compliant Mini Disc recording apparatus is developed and encrypted content data can be recorded to a Mini Disc, the encrypted content data recorded to the Mini Disc cannot be reproduced by many non-SDMI-compliant Mini Disc players. Namely, such a system will not provide the compatibility in reproduction.

This may eventually restrict the proper use of the SDMI content purchased by general users, thereby significantly lowering the value and satisfaction to general users of SDMI content providing services.

In consideration of the above-mentioned problem, a system may be proposed in which SDMI content is transferred, in a decrypted state, to a non-SDMI Mini Disc recording apparatus for example to be copied to a secondary recording medium such as a Mini Disc.

However, if this manner of copying is permitted, content data can be copied easily, including unauthorized copy. This may prevent the implementation of copyright protection which is the inherent intent of SDMI.

SUMMARY OF THE INVENTION

It is therefore an object of the present invention to maintain copyright protection capability without restricting the proper use by users of content data such as music requiring copyright protection. To implement this object, the present invention provides a data transfer apparatus, a data recording apparatus, and a data transfer system composed of these apparatuses, a data transfer method which is executed in the data transfer apparatus and a recording medium storing an operation program which implements the data transfer apparatus.

In carrying out the invention and according to one aspect thereof, there is provided a data transfer apparatus including a transmitter for transferring content data encrypted in a predetermined manner from a first memory which can store encrypted content data to an external apparatus, a discriminator for discriminating between a first external apparatus which can record only encrypted content data to a second memory accommodated in the external apparatus connected to the data transfer apparatus and a second external apparatus which can record only decrypted content data to the second memory, and if the first external apparatus is discriminated by the discriminator, a controller for decrementing a transfer count of the encrypted content data when transferring the encrypted content data from the first memory to the external apparatus, incrementing the transfer count when the encrypted content data are returned from the first external apparatus, and disabling the transfer of the content data from the first memory to the external apparatus if the transfer count has exceeded a predetermined limit value and, if the second external apparatus is discriminated by the discriminator, the controller disabling the return of the encrypted content data from the second external apparatus.

In carrying out the invention and according to another aspect thereof, there is provided a data transfer system having a data transfer apparatus and at least one of a first external apparatus and a second external apparatus which can be selectively connected to the data transfer apparatus, the data transfer apparatus including a transmitter for transferring content data encrypted in a predetermined manner from a first memory which can store encrypted content data to an external apparatus, a discriminator for discriminating between a first external apparatus which can record only encrypted content data to a second memory accommodated in the external apparatus connected to the data transfer apparatus and a second external apparatus which can record only decrypted content data to the second memory, and if the first external apparatus is discriminated by the discriminator, a controller for decrementing a transfer count of the encrypted content data when transferring the encrypted content data from the first memory to the external apparatus, incrementing the transfer count when the encrypted content data are returned from the first external apparatus, and disabling the transfer of the content data from the first memory to the external apparatus if the transfer count has exceeded a predetermined limit value and, if the second external apparatus is discriminated by the discriminator, the controller disabling the return of the encrypted content data from the second external apparatus, the second external apparatus including a receiver for receiving the content data encrypted in a predetermined manner from the transmitter, a decryption element for decrypting the content data encrypted in a predetermined manner received by the receiver and a recording element for recording the content data decrypted by the description element into the second memory.

In carrying out the invention and according to still another aspect thereof, there is provided a data recording apparatus which receives encrypted content data from a data transfer apparatus having a first recording medium storing the encrypted content data and records the received encrypted content data to a second recording medium, including a communication line for performing bidirectional communication with the data transfer apparatus, an authorization processor for performing authentication with the data transfer apparatus through the communication line, a decryption element for decrypting the encrypted content data supplied from the data transfer apparatus through the communication line, a recording element for recording the content data decrypted by the description element to the second recording medium and a controller for disabling the return of the content data from the second recording medium to the data transfer apparatus through the communication line.

BRIEF DESCRIPTION OF THE DRAWINGS

These and other objects of the invention will be seen by reference to the description, taken in connection with the accompanying drawing, in which:

FIG. 9 illustrates the content flow and usage rule practiced as a fourth embodiment of the invention.

DETAILED DESCRIPTION OF PREFERRED EMBODIMENTS

Figure 1:
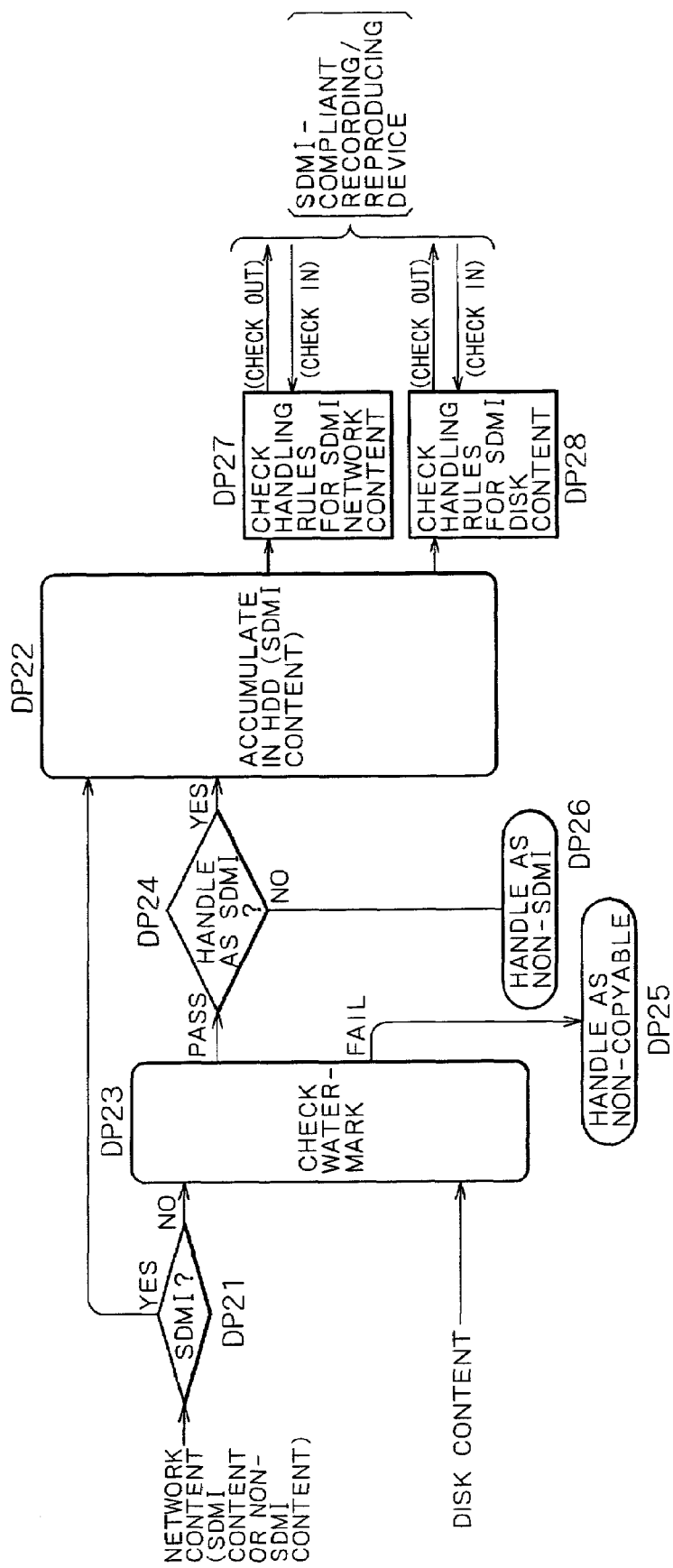
FIG. 1 is a schematic diagram illustrating the content flow and usage rule formulated by SDMI.

This invention will be described in further detail by way of example with reference to the accompanying drawings in the following order:

1. System configuration
2. Exemplary configuration of data transfer apparatus (primary recording medium side apparatus=PC)
3. Exemplary configuration of data recording apparatus (secondary recording medium side apparatus=recording/reproducing apparatus)
4. Authentication processing
5. Example of SDMI content transfer processing 1. System Configuration Referring to FIG. 2, there is shown an exemplary system configuration. A primary recording medium side apparatus 1 corresponds to a data transfer apparatus associated with the present invention. A secondary recording medium side apparatus 20A corresponds to a data recording apparatus associated with the present invention. Therefore, the configuration made up of the primary recording medium side apparatus 1 and secondary recording medium side apparatus 20A shown in FIG. 2 corresponds to a data transfer system associated with the present invention.

The primary recording medium side apparatus 1 is constituted by a personal computer for example. In what follows, the primary recording medium side apparatus 1 is also referred to as a personal computer (PC) 1 for the convenience of description. However, the primary recording medium side apparatus 1 may not always be constituted by a personal computer; it may be any device installed with software and having a mass storage device.

The primary recording medium side apparatus 1 functions as the data transfer apparatus as referred to herein by executing the software, which is activated on a personal computer for example, for storing and/or transferring SDMI content data.

An HDD 5 incorporated in (or externally attached to) the personal computer 1 serves as a primary recording medium (and a primary recording medium drive means). It should be noted that, in the description of the embodiments, the HDD 5 is the primary recording medium; however, it will be apparent that the primary recording medium may also be a disk medium such as optical disk or magneto-optical disk or a semiconductor memory which is incorporated or portable (such as memory card) for example.

The primary recording medium side apparatus 1 is communicable with a content server 91 via a communication network 110, downloading content data such as music from the content server 91. Obviously, there are a plurality of content servers 91, from which the user of the personal computer 1 can use various downloading services as desired.

The content data to be downloaded from the content server 91 to the personal computer 1 includes SDMI-compliant content data and non-SDMI-compliant content data.

A transmission path constituting the communication network 110 may be a wired or wireless public switched line network or a dedicated line arranged between the personal computer 1 and the content server 91. The communication network 110 may be communication satellite line, ISDN (Integrated Services Digital Network), analog telephone line, or Bluetooth, for example.

The HDD 5 of the personal computer 1 can also store content data such as music reproduced from package media 90 (hereafter also referred to as a disk 90) such as CD-DA and DVD by an incorporated or externally attached disk drive.

The personal computer 1 is connected to the secondary recording medium side apparatus 20A or 20B, to which the content data can be transferred from the HDD 5. The secondary recording medium side apparatus 20A or 20B is a recording apparatus or a recording and reproducing apparatus for the secondary recording media. The secondary recording medium side apparatus 20A or 20B can copy the content data transferred from the personal computer 1 to the secondary recording media.

The secondary recording medium side apparatuses 20A and 20B are various in specific form. The secondary recording medium side apparatus 20B herein is an SDMI-compliant recording apparatus. Namely, the SDMI-compliant recording/reproducing apparatus shown in FIG. 1 corresponds to the secondary recording medium side apparatus 20B. In this case, the secondary recording medium is an SDMI-compliant memory card based on a semiconductor memory such as flash memory, for example. Therefore, the secondary recording medium side apparatus 20B is a recording/reproducing apparatus compatible with SDMI-compliant memory cards for example. In this case, SDMI content is recorded to the secondary recording medium as encrypted.

On the other hand, the secondary recording medium side apparatus 20A corresponds to the data recording apparatus referred to herein. The secondary recording medium side apparatus 20A stores the copyright-protected SDMI content in the secondary recording medium as decrypted, of which details will be described later. One example herein of the secondary recording medium is the Mini Disc. Therefore, the secondary recording medium side apparatus 20A is a Mini Disc recording/reproducing apparatus. In what follows, the secondary recording medium side apparatus 20A may also be referred to as the recording/reproducing apparatus 20A.

In addition to the Mini Disc, the media which is recorded or reproduced by the secondary recording medium side apparatus 20A include memory cards based on semiconductor memory such as flash memory, the Mini Disc as magneto-optical disk, CD-R (CD Recordable), CD-RW (CD Rewritable), DVD-RAM, DVD-R, and DVD-RW, for example. Therefore, the secondary recording medium side apparatus 20A may be any device that is compatible with these recording media.

The personal computer 1 is connected to the secondary recording medium side apparatus 20A or 20B on the basis of a transmission protocol such as USB (Universal Serial Bus) or IEEE 1394. It will be apparent that control signals and content data may also be transferred in between over a wired or wireless transmission path based on other transmission protocol such as Bluetooth or DS-SS (compliant with IEEE 802.11b).

2. Exemplary Configuration of Data Transfer Apparatus (Primary Recording Medium Side Apparatus=PC)

Figure 3:
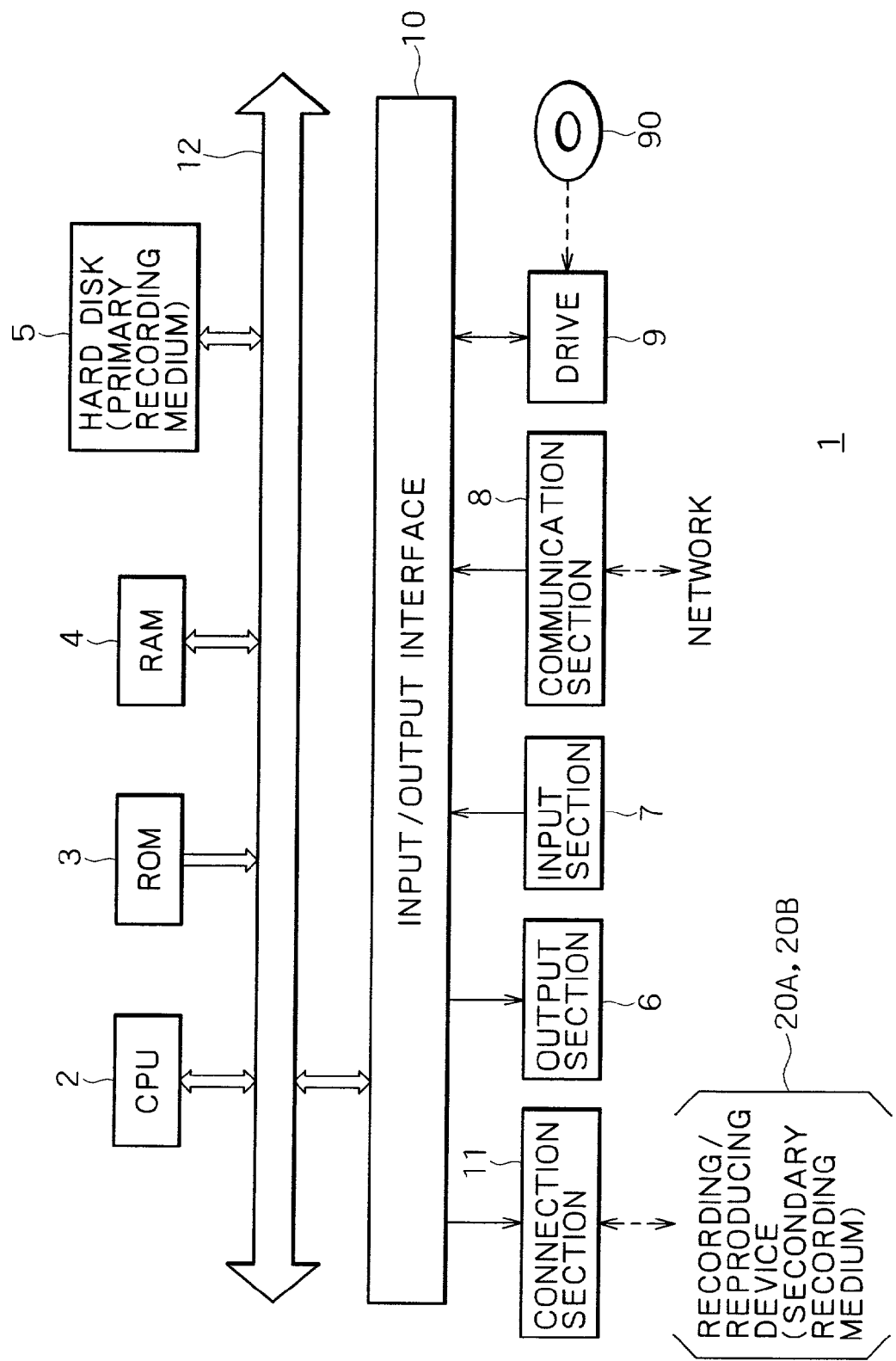
FIG. 3 is a block diagram illustrating a primary recording medium side apparatus applicable to the invention.

Referring to FIG. 3, there is shown a configuration of the primary recording medium side apparatus 1 which provides the data transfer apparatus. It should be noted that, in this example, the primary recording medium side apparatus 1 is constituted by a personal computer; it will be apparent that the primary recording medium side apparatus 1 may also be constituted as a data-transfer-only apparatus based on dedicated hardware having the same capabilities.

In this example, when a software program for executing the capabilities as the data transfer apparatus is installed in the personal computer 1, the primary recording medium side apparatus to provide the data transfer apparatus is implemented. It should be noted that "personal computer" or "computer" referred to herein generically denotes a so-called general-purpose computer.

This software program can be stored beforehand in the hard disk (HDD) 5 or the ROM 3 incorporated in the computer as a recording medium.

Alternatively, this software program can be stored (or recorded) temporarily or permanently in a removable recording medium 90 such as floppy disk, CD-ROM (Compact Disk Read Only Memory), MO (Magneto Optical) disk, DVD (Digital Versatile Disk), magnetic disk, or semiconductor memory. The removable recording medium 90 can be provided as so-called package software.

It should be noted that, in addition to the installation from the removable recording medium 90 into the computer, the program can be downloaded from a download site to the computer in a wireless manner via a digital broadcast satellite or in a wired manner via the network such as a LAN (Local Area Network) or the Internet. The computer receives the downloaded program at its communication section 8 and stores it into the incorporated HDD 5.

The computer 1 shown on FIG. 3 incorporates a CPU (Central Processing Unit) 2. The CPU 2 is connected to an input/output interface 10 via a bus 12. When a command is inputted by the user by operating an input section 7 constituted by a keyboard, a mouse, and a microphone for example, the CPU 2 accordingly executes the program stored in the ROM (Read Only Memory) 3. In addition, the CPU 2 executes the program stored in the HDD 5, the program transferred from a communication satellite or a network, received at the communication section 8, and stored in the HDD 5, or the program read from the removable recording medium 90 such as an optical disk loaded in the drive 9 and installed in the HDD 5, by loading the program into a RAM (Random Access Memory) 4. Thus, the CPU 2 executes the processing as the data transfer apparatus on SDMI content to be described later.

Then, the CPU 2 outputs the obtained processing results from an output section 6 constituted by a LCD (Liquid Crystal Display) and a speaker for example via the input/output interface 10, transmits them from the communication section 8, or records them to the HDD 5.

Figure 2:
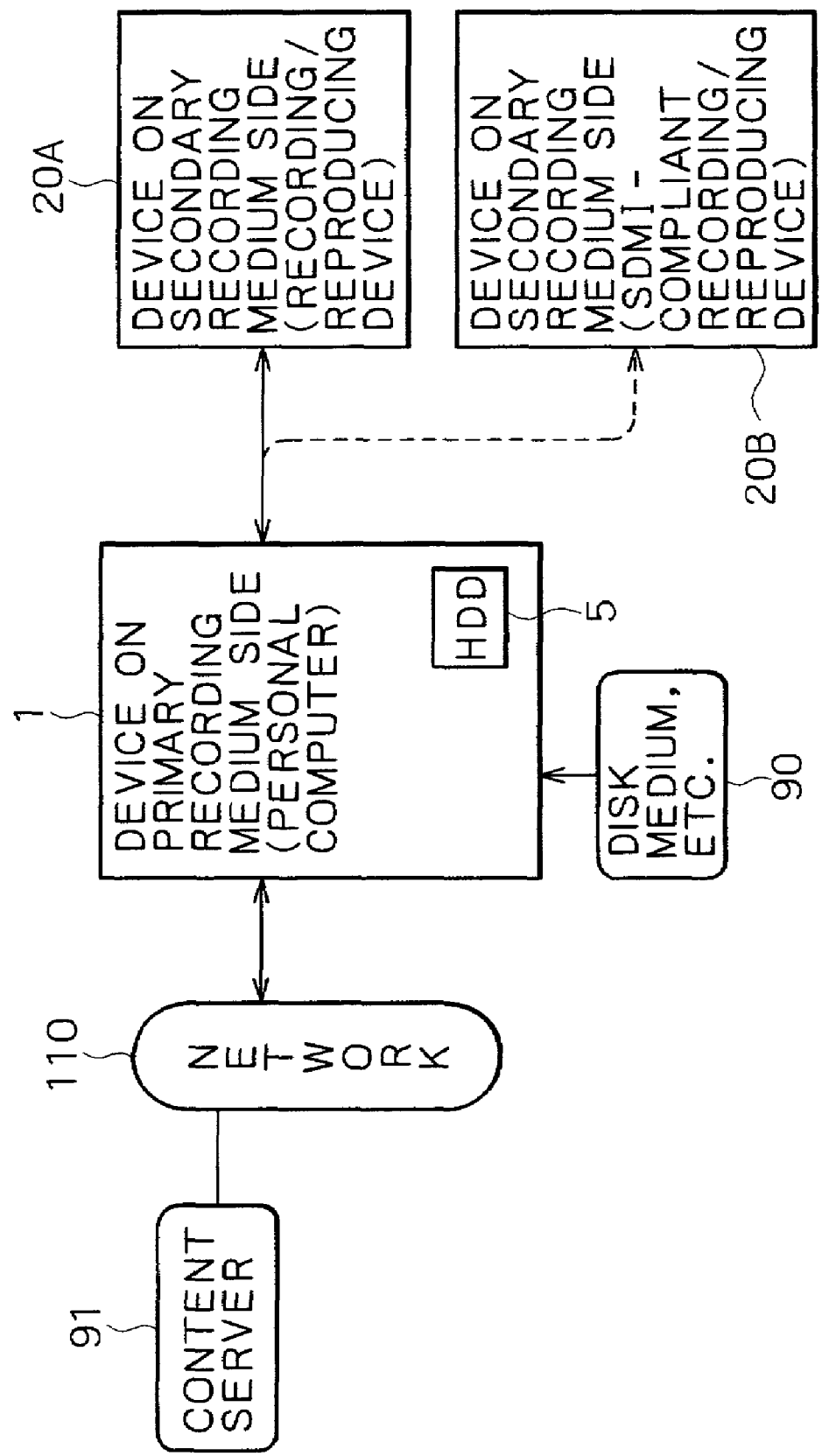
FIG. 2 is a block diagram illustrating an overall system applicable to the invention.

In the present example, the communication section 8 can communicate with various servers via the network 110 shown in FIG. 2. Namely, the computer 1 can download network content such as music from an external content server 91. The network content to be downloaded is processed as SDMI-compliant content or non-SDMI-compliant content by a procedure to be described later, the processed SDMI content in the case of SDMI processing being stored in the HDD 5. The SDMI content stored in the HDD 5 becomes the content to be transferred to the secondary recording medium side apparatus 20B compliant with SDMI or the secondary recording medium side apparatus (the recording/reproducing apparatus) 20A of authorized type, which is the data recording apparatus associated with the present invention.

A connection section 11 provides connection between the primary recording medium side apparatus 1 and the secondary recording medium side apparatuses 20A or 20B. The connection section 11 is USB interface or IEEE 1394 interface for example. It will be apparent that other standard interfaces, wired or wireless based on infrared or radio may be used.

The authentication processing and data transfer processing to be executed by the data transfer apparatus of the present example will be described later. It should be noted that these processing operations need not be executed in a time-dependent manner along a procedure to be described later; they may be executed in parallel or discretely (for example, in parallel processing or object processing).

The above-mentioned programs may be processed by a single computer or by two or more computers in a distributed manner. Further, these programs may be transmitted to remote computers for execution.

3. Exemplary Configuration of Data Recording Apparatus (Secondary Recording Medium Side Apparatus=Recording/Reproducing Apparatus)

Figure 4:
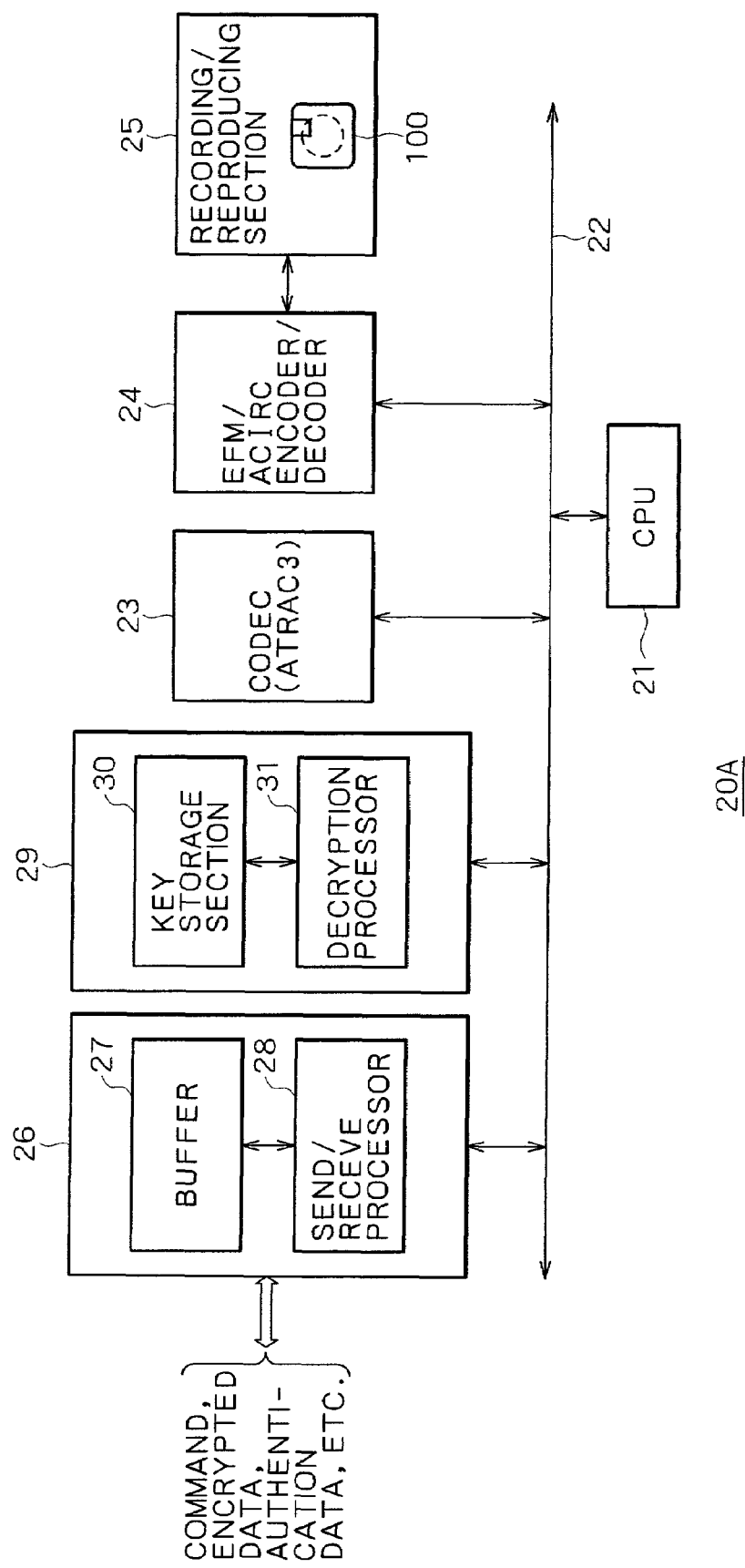
FIG. 4 is a block diagram illustrating a secondary recording medium side apparatus applicable to the invention.

Referring to FIG. 4, there is shown an exemplary configuration of the secondary recording medium side apparatus (the recording/reproducing apparatus) 20A corresponding to the data recording apparatus associated with the present invention.

In this example, the secondary recording medium side apparatus 20A is configured as a Mini Disc recorder for example. Therefore, a secondary recording medium 100 is the example of a Mini Disc (one kind of magneto-optical disk) and therefore is also referred to as a Mini Disc 100.

It should be noted that FIG. 4 shows only a processing system for recording/reproducing data on the Mini Disc as the secondary recording medium 100 and a processing system for authentication and data transfer with the above-mentioned primary recording medium side apparatus 1, omitting the detailed illustration of a Mini Disc 100 drive system, servo system, and reproduction and output system because these systems are generally the same as those of an ordinary Mini Disc recording/reproducing apparatus.

A CPU 21 is a system controller for controlling the entire recording/reproducing apparatus 20A. To be more specific, the CPU 21 executes operations for controlling rotary drive, spindle servo, focus servo, tracking servo, sled servo, operations for controlling optical head laser beam and magnetic head magnetism application, and operations for controlling the encoding and decoding of recorded and reproduced data, thereby recording and reproducing the data on the Mini Disc 100. In addition, the CPU 21 controls the communication for the authentication with the personal computer 1 and the indication for data generation, the transfer of various commands issued from the personal computer 1, and the processing of received content data.

Although not shown, an operator panel and a display section are arranged as the user interface. The CPU 21 also executes the processing such as the monitoring of user operations made at the operator panel and the control of the display section.

A recording/reproducing section 25 has an optical head, a magnetic head, a disk rotary drive system, a servo system, and so on, thereby actually recording and reproducing data on the Mini Disc 100.

An encoder/decoder 24 encodes the data to be recorded to the Mini Disc 100 and decodes the data reproduced therefrom. As is known, in the case of a Mini Disc system, the data to be recorded are put through ACIRC (Advanced Cross Interleave Reed Solomon Coding) and EFM (Eight-to-Fourteen Modulation). Thus, the encoder/decoder 24 performs ACIRC and EFM processing on the recording data and supplies the resultant data to the recording/reproducing section 25.

At reproduction, the encoder/decoder 24 performs decoding such as binarization, EFM, and ACIRC on the data supplied from the recording/reproducing section 25.

A codec 23 performs data compression and decompression on the basis of the ATRAC/ATRAC3 algorithm.

As described above, the data to be recorded to the Mini Disc 100 are compressed by ATRAC (Acoustic TRansform Adaptive Coding) and then encoded. Therefore, if data not compressed, for example PCM audio data are inputted in the recording/reproducing apparatus secondary recording medium side apparatus 20A as recording data, the inputted data are compressed by the codec 23 on the basis of ATRAC and the compressed data are supplied to the encoder/decoder 24.

It should be noted that there are two audio data compression schemes; ATRAC and ATRAC3, the latter being higher in compression efficiency than the former. As compared with bit rate of 292 Kbps of ATRAC, ATRAC3 provides two bit rates 132 Kbps and 66 Kbps, one of which can be selected. The Memory Stick (MS) recognized as an SDMI-compliant secondary recording medium encrypts the audio data compressed by ATRAC3 and stores the encrypted data. Recently, some commercially available Mini Disc apparatuses, which are non-SDMI-compliant secondary recording media, have ATRAC encoder/decoder and ATRAC3 encoder/decoder to store unencrypted ATRAC and ATRAC3 data.

At reproduction, the data read by the recording/reproducing section 25 and decoded by the encoder/decoder 24 are the data compressed on the basis of ATRAC. Hence, the compressed data are decompressed by the codec 23. Consequently, digital audio data of 44.1 KHz and 16-bit quantized for example are demodulated. The demodulated digital audio data are D/A converted, analog signal processed, and amplified by output line circuits, not shown, to become a speaker output signal, being reproduced as music for example.

Alternatively, the digital audio data can be outputted without change to another apparatus.

The above-mentioned configuration also applies to the recording/reproducing apparatus of ordinary Mini Disc systems. The recording/reproducing apparatus secondary recording medium side apparatus 20A of the present embodiment has an interface 26 and a decryption section 29 as sections corresponding to the personal computer 1 as the primary recording medium side apparatus 1. Further, as depicted in FIG. 3, the CPU 21 is connected via a bus 22 to the codec 23, the encoder/decoder 24, the interface 26, and the decryption section 29.

The interface 26 connects to the connection section 11 of the personal computer 1 shown in FIG. 3, executing data communication with the personal computer 1. Hence, the interface 26 has a buffer 27 for buffering send/receive data and a send/receive processor 28 for performing signal processing on the interface. For example, the interface 26 performs signal processing on the basis of USB or IEEE 1394 communication protocol.

The communication with the personal computer 1 through the interface 26 includes the reception of various commands from the personal computer 1, the transmission and reception of the data necessary for authentication processing to be described later, and the reception of SDMI content.

The decryption section 29 decrypts SDMI content and has a key storage section 30 and a decryption processor 31.

The key storage section stores keys (key CK and key CK' for example) for decrypting encrypted SDMI content. These keys may be stored beforehand or transmitted from the personal computer 1 to the recording/reproducing apparatus 20A at a predetermined time. When the personal computer 1 transmits these keys, they may be encrypted by another key CCK, the received keys are decrypted on the recording/reproducing apparatus 20A by use of the key CCK, and the decrypted keys are stored in the key storage section 30.

Storing the keys, such as the key CK and the like, for decrypting SDMI content allows the decryption processor 31 to decrypt the SDMI content received as encrypted by key CK for example, namely the content in the state of E(CK, A3D) for example. Namely, the data compressed by ATRAC3 decrypted as D{CK, E(CK, A3D)}=A3D can be obtained. The ATRAC3 data thus decrypted are encoded by the encoder/decoder 24 to be recorded to the Mini Disc 100 through the recording/reproducing section 25.

It should be noted that SDMI content is not always ATRAC3-compressed data which are encrypted. For example, SDMI content may be linear PCM data which are encrypted by key CK. Namely, content in the state of E(CK, PCM) for example may be inputted. In this case, obviously, the linear PCM data decrypted as D{CK, E(CK, PCM)}= PCM can be obtained in the decryption processor 31. In this case, the PCM data is ATRAC3-compressed by the codec 23, encoded by the encoder/decoder 24, and recorded to the Mini Disc 100 through the recording/reproducing section 25.

The key storage section 30 may also store keys for authentication processing. An exemplary authentication processing to be described later uses public key P and secret key S stored in the recording/reproducing apparatus 20A. In this case, both public key P and secret key S are stored in the key storage section 30.

4. Authentication Processing

The recording/reproducing apparatus 20A as referred to herein denotes a recording/reproducing apparatus having a configuration as described in FIG. 4 and successfully authenticated by the personal computer 1. The recording/reproducing apparatus 20A records the SDMI content received from the personal computer 1 to the Mini Disc 100 as decrypted, which will be described later in detail. Authentication checks the recording/reproducing apparatus to see if it is valid as a device permitted for performing recording operations.

This authentication processing is executed when a recording/reproducing apparatus other than the SDMI-compliant recording/reproducing apparatus 20B is connected. It should be noted that, if the SDMI-compliant recording/reproducing apparatus 20B is connected, processing for checking if this apparatus is the SDMI-compliant as referred to herein. Namely, if the connected apparatus is found other than the SDMI-compatible recording/reproducing apparatus 20B, the following authentication processing will be performed to check to see whether or not the connected apparatus is the recording/reproducing apparatus 20A.

The authentication processing in the present example uses an authentication scheme based on asymmetrical cryptography (or public key cryptography). In asymmetrical cryptography, the encryption key is different from the decryption key. Let data before encryption be Db, encryption key be CKe, and decryption key be CKd, then encryption data C are encrypted by C=E(CKe, Db) and data Db are decrypted by D(CKd, C)=Db.

Encryption key CKe and decryption key CKd are called a key pair, one of them being made public as the public key while the other being held in a predetermined portion as the secret key.

In the following authentication processing, of the key pair CKe and CKd, public key is represented by P and the secret key is represented by S. As described above, in this case, the recording/reproducing apparatus 20A stores public key P and secret key S providing encryption key CKe and decryption key CKd in the key storage section 30.

Figure 5:
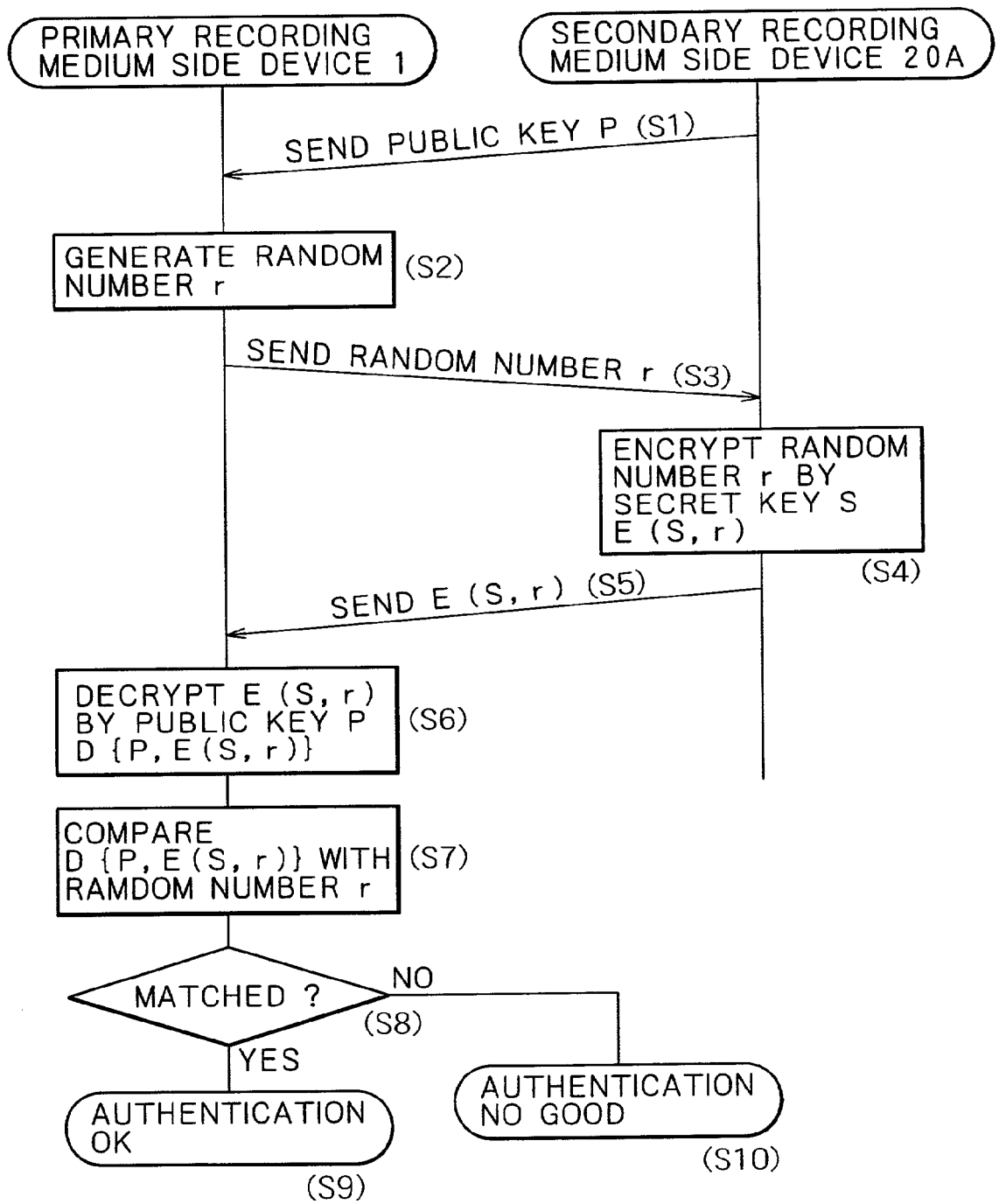
FIG. 5 is a transaction diagram illustrating a procedure of authentication processing between the primary recording medium side apparatus and the secondary recording medium side apparatus.

When authentication processing is performed, the CPU 2 of the primary recording medium side apparatus (personal computer) 1 for example sends a command for authentication request to the CPU 21 of the secondary recording medium side apparatus 20A (recording/reproducing apparatus) and then the following processing takes place between the CPU 2 (primary recording medium side apparatus 1=personal computer 1) and the CPU 21 (secondary recording medium side apparatus 20A=recording/reproducing apparatus 20A) as shown in FIG. 5.

When authentication processing starts, the CPU 21 of the secondary recording medium side apparatus 20A transmits public key P from the key storage section 30 to the primary recording medium side apparatus 1 through the interface 26 in step S1. It should be noted that public key P is also known by the primary recording medium side apparatus 1.

Receiving public key P, the CPU 2 of the primary recording medium side apparatus 1 generates a random number r in step S2. In step S3, the CPU 2 transmits the generated random number r to the secondary recording medium side apparatus 20A.

Next, the CPU 21 of the secondary recording medium side apparatus 20A encrypts the received random number r by use of secret key S stored in the key storage section 30 in step S4. In step S5, the CPU 21 transmits the encrypted data E(S, r) to the primary recording medium side apparatus 1.

Receiving the encrypted data E(S, r), the CPU 2 of the primary recording medium side apparatus 1 decrypts the received encrypted data E(S, r) by use of public key P in step S6. Namely, the CPU 2 executes processing of D{P, E(S, r)}.

In step S7, the CPU 2 compares the random number r generated in step S2 with the decryption result D{P, E(S, r)} obtained in step S6.

If public key P and secret key S are of an appropriate key pair, then result r=D{P, E(S, r)} should be obtained.

If a match is found, then it indicates that the secondary recording medium side apparatus 20A holds secret key S for public key P, upon which the procedure goes from S8 to S9, in which the secondary recording medium side apparatus 20A is authenticated as an authorized mate of connection.

On the other hand, if no match is found, the procedure goes from S8 to S10, in which the connected secondary recording medium side apparatus is regarded as not the authorized mate of connection (namely the device to which SDMI content can be transferred), thereby failing authentication.

If the connected apparatus is successfully authenticated as the secondary recording medium side apparatus of the present example by the above-mentioned authentication processing, the primary recording medium side apparatus 1 recognizes that one of the conditions for permitting the transfer of SDMI content to that connected apparatus has been satisfied.

5. Example of SDMI Content Transfer Processing

The following describes the transfer of SDMI content from the primary recording medium side apparatus (personal computer) 1 to the secondary recording medium side apparatus 20A as one embodiment of the present invention by use of first through fourth examples. These examples will be described with reference to FIGS. 6 through 9 by use of the data paths as with FIG. 1. The data path shown in each of FIGS. 6 through 9 is executed by the processing of the CPU 2 of the personal computer 1. To be more specific, the CPU 2 executes the following data path processing on the basis of a transfer processing program installed from the removable recording medium 90 for example.

It should be noted that the procedures/processing on the data paths shown in FIGS. 6 through 9 are denoted by DP1 through DP11. In what follows, these references are used for corresponding portions.

First Example of Transfer Processing

Figure 6:
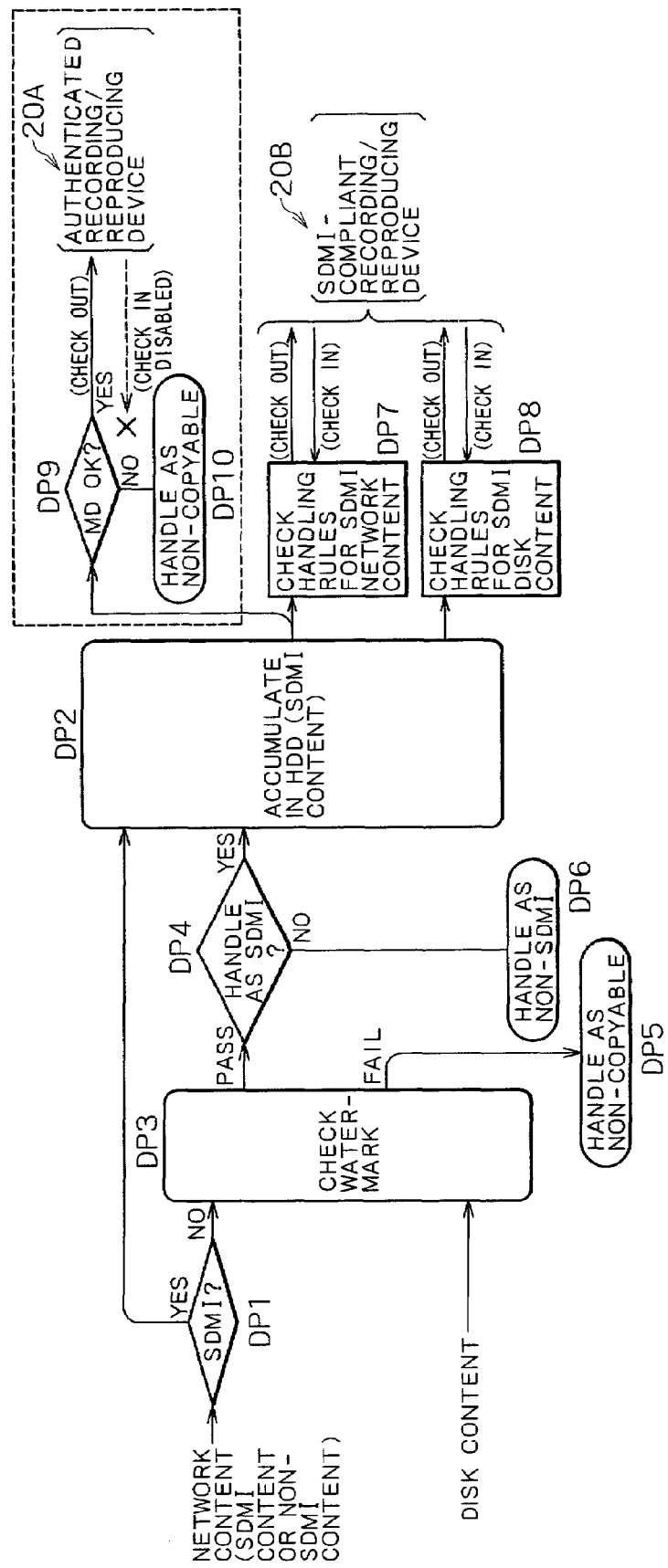
FIG. 6 illustrates the content flow and usage rule practiced as a first embodiment of the invention.

The following describes the first example of transfer processing by use of the data path shown in FIG. 6.

Network content distributed from the content server 91 shown in FIG. 1 to the personal computer 1 via the network 110 is determined whether or not it should be copyright-protected on the basis of SDMI (DP1).

The network content to be distributed includes SDMI-compliant content which is transmitted from the server as content compliant with SDMI and non-SDMI-compliant content.

In the case of SDMI-compliant content, its data are encrypted by content key CK on the basis of key cryptography such as DES. If the content data themselves are data encoded by a compression scheme such as ATRAC3, then the SDMI-compliant content is distributed in the state of E(CK, A3D)

If the distributed content is SDMI-compliant content, it is stored in the HDD 5, which is the primary recording medium, as SDMI content (DP1 to DP2).

In this case, the content data are written to the HDD 5 in the distributed state of E(CK, A3D). Alternatively, the content data are decrypted and then encrypted by another key CK' (namely encryption keys are changed) and then written to the HDD 5 in the state of E(CK', A3D).

On the other hand, if the network content is non-SDMI content, then it is watermark-checked, namely, screened by watermark (DP1 to DP3).

Further, the content data (disk content) read from a package medium such as CD-DA or DVD for example which is reproduced by the drive 9 such as CD-ROM drive of the personal computer 1 or a disk drive connected thereto is directly watermark-checked (DP3).

Namely, the content data not compliant with SDMI are watermark-checked.

If the content data are found not passing the watermark check, the content data are handled as non-copyable on the SDMI data path (DP3 to DP5). Although the specific handling depends on the software design used, the failing content data are stored in the HDD 5 but not transferred to another recording medium for copy or move or not stored in the HDD 5 in the content processing compliant with SDMI.

If the content data have passed the watermark check, namely if a watermark is found in the content data and a control bit indicates the permission of copy, then the content data are found rightfully copyable. Next, whether or not the content data are to be handled on the basis of SDMI is determined (DP4). Whether or not to handle these content data as compliant with SDMI may be determined by the software design or user setting.

If the content data are not handled as compliant with SDMI, then the content data are regarded as non-SDMI content and excluded from the content data path compliant with SDMI (DP6). For example, these content data may be transferred to recording apparatuses which are not compatible with SDMI.

On the other hand, if the content data are to be handled as compliant with SDMI, then these content data are encrypted and stored in the HDD 5 as SDMI content (DP4 to DP2). For example, these content data are stored in the HDD 5 in the form of E(CK, A3D) or E(CK', A3D).

The above-mentioned data path stores, in the HDD 5, the content handled as compliant with SDMI obtained via a network (SDMI network content) and the content handled as compliant with SDMI retrieved from a disk such as CD-DA (SDMI disk content).

The SDMI content (SDMI network content or SDMI disk content) stored in the HDD 5 is transferred to the recording/reproducing apparatus 20B compliant with SDMI to be copyable to the secondary recording medium compliant with SDMI. In the present example, in addition to the SDMI-compatible recording/reproducing apparatus 20B, the SDMI content can be transferred to the successfully authenticated recording/reproducing apparatus 20A under a predetermined condition.

First, the following operation takes place if the SDMI-compliant recording/reproducing apparatus 20B is connected to the connection section 11.

In the case of SDMI disk content, the transfer handling rule (usage rule) corresponding to SDMI disk content is determined. Therefore, under this handling rule, the transfer to the SDMI-compliant recording/reproducing apparatus 20B for copy is permitted (DP8).

The rules of transferring SDMI disk content may define a checkout upper limit count that each piece of content data can be checked out a maximum of three times for example. Therefore, SDMI disk content can be copied up to three SDMI-compliant secondary recording media for example. If a check-in takes place, the checkout count of the content data is decremented. Consequently, even after the copying to three SDMI-compliant secondary recording media, if content data are checked in from one of these secondary recording media, that content can be copied to the SDMI-compliant media once again. Namely, content data are allowed to exist together always on up to three SDMI-compliant secondary recording media.

In the case of SDMI network content, a transfer handling rule (usage rule) corresponding to SDMI network content is also defined, on the basis of which the transfer for copy to the SDMI-compliant recording/reproducing apparatus 20B is authorized (DP7).

This transfer handling rule specifies the upper limit of checkout count for example as with the rule for SDMI disk content. The upper limit count may be the same as or different from the rule for SDMI disk content. For example, the upper limit checkout count may be one. In this case, one piece of content data can be copied to only another one SDMI-compliant secondary recording medium; however, if content data are checked in from that secondary recording medium, the content data can be transferred for copy again.

When SDMI content is transferred for copy to an SDMI-compliant secondary recording medium in accordance with these handling rules, the content data are transmitted as encrypted on the transmission path. Namely, the content data are transmitted in the above-mentioned state of E(CK, A3D) or E(CK', A3D).

Further, on the SDMI-compliant recording/reproducing apparatus 20B which has received the encrypted SDMI content, the received SDMI content is copied to the secondary recording medium as encrypted.

If the SDMI-compliant recording/reproducing apparatus 20B reproduces the SDMI content from the secondary recording medium, the content data read from the secondary recording medium are decrypted. Namely, the content data copied to the secondary recording medium in the state of E(CK, A3D) or E(CK', A3D) are decrypted by key CK or key CK'.

More specifically, the original content data are restored as the ATRAC3 data (A3D) decrypted as D{CK, E(CK, A3D)}=A3D or D{CK', E(CK', A3D)}=A3D. The decrypted content data are then decompressed from ATRAC3 compression to be demodulated as audio data for example, which are reproduced as music.

As described, the SDMI-compliant content data are kept encrypted on the data path up to a point at which the content data are checked out and up to the secondary recording medium and the copy control is executed by the above-mentioned transfer handling rule check, thereby protecting content data copyright.

The processing described so far is generally the same as the normal SDMI data path described with reference to FIG. 1.

The following describes the portion indicated by dashed lines shown in FIG. 6, which is a difference from the configuration shown in FIG. 1 (this difference forms one of the features of the present invention).

If the recording/reproducing apparatus 20A successfully authenticated as described above is connected to the connection section 11, the following processing is executed.

If the processing of transferring certain SDMI network content stored in the HDD 5 to the recording/reproducing apparatus 20A is requested, a control signal attached to this SDMI network content is checked to see whether or not "MDOK" flag is active (DP9).

This MDOK flag provides control information indicative whether or not the content server 91 or the copyright holder permits the copying and recording certain content to a Mini Disc, which is the secondary recording medium, in the decrypted state. Namely, the MDOK flag is the control information which is preset on the side of the content server 91.

It should be noted that "MDOK" is a flag name which is given for the convenience of description in correspondence with the case in which the Mini Disc is used in the recording/reproducing apparatus 20A for example. If the secondary recording medium 100 is other than the Mini Disc, it does not mean that this flag processing will not apply.

If the MDOK flag is active, the SDMI network content can be transferred to the recording/reproducing apparatus 20A.

However, as a further condition, the content data which have been transferred once and then copied and recorded to the Mini Disc 100 cannot be checked in.

When transferring SDMI network content to the recording/reproducing apparatus 20A under these conditions, the data transmission is executed on the transmission path in the encrypted state. Namely, the SDMI network content is transferred in the above-mentioned state of E(CK, A3D) or E(CK', A3D).

This encrypted SDMI network content is received at the interface 26 of the recording/reproducing apparatus 20A shown in FIG. 4 and decrypted in the decrypting section 29 into the original ATRAC3 compressed data (A3D) for example. Then, the decrypted content data are encoded by the encoder/decoder 24, and encoded content data are supplied to the recording/reproducing section 25 to be copied and recorded to the Mini Disc 100.

Therefore, to reproduce the SDMI content recorded by the recording/reproducing apparatus 20A to the Mini Disc 100, the data read from the Mini Disc 100 may only be decoded in a Mini Disc system in a normal manner; namely, EFM, ACIRC, and ATRAC decompression may only be executed on the data read from the Mini Disc 100.

This indicates that the Mini Disc 100 copied and recorded with content data can reproduce them also when loaded on an ordinary Mini Disc player. Namely, by use of an ordinary, non-SDMI-compliant Mini Disc player, the user can play back the SDMI network content copied and recorded to the Mini Disc 100 to enjoy music for example.

It should be noted that, if the MDOK flag of the SDMI network content to be transferred is off, the transfer is not permitted; namely, this SDMI network content is handled as non-copyable (DP10) The processing of transfer to other recording/reproducing apparatuses than the SDMI-compliant recording/reproducing apparatus 20B is summarized as follows.

SDMI network content can be transferred to the recording/reproducing apparatus 20A, namely copied and recorded to the Mini Disc 100 in the unencrypted state when the conditions (1) the recording/reproducing apparatus 20A has been successfully authenticated, (2) the MDOK flag of the content data to be transferred is active (the transfer is authorized by the copyright holder), and (3) check-in is disabled, are all satisfied.

Consequently, the user can effectively use the SDMI network content recorded to the Mini Disc 100, thereby enhancing the serviceability for users. At the same time, while the transfer is permitted under the above-mentioned three conditions, the SDMI network content data cannot be transferred to other apparatuses than the SDMI-compliant recording/reproducing apparatus 20B in an unconditional manner and, because the SDMI network content is transferred in the encrypted state, the copyright protection capability is secured.

Second Example of Transfer Processing

Figure 7:
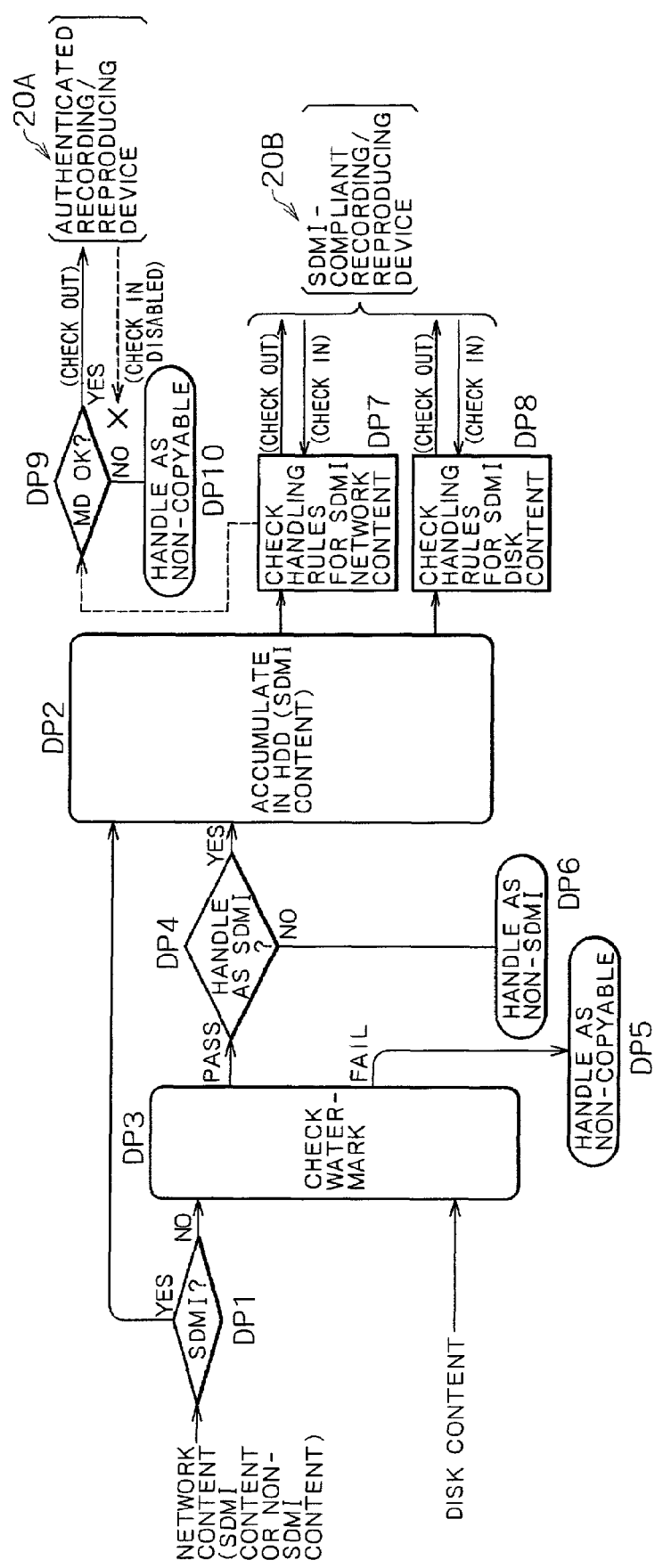
FIG. 7 illustrates the content flow and usage rule practiced as a second embodiment of the invention.

The following describes the second example of transfer processing with reference to the data path shown in FIG. 7. It should be noted that DP1 through DP8 are generally the same as shown in FIG. 6 and their descriptions will be skipped; only the case in which the authenticated recording/reproducing apparatus 20A is connected to the personal computer 1. The portion which differs from the first embodiment is indicated by dashed lines in FIG. 7.

When the authenticated recording/reproducing apparatus 20A is connected to the connection section 11, the following processing is executed.

If the processing of transferring certain SDMI network content stored in the HDD 5 to the recording/reproducing apparatus 20A is requested, the transfer handling rule check is first performed on the SDMI network content (DP7). Namely, regardless whether the connected apparatus is the SDMI-compliant recording/reproducing apparatus 20B or the authenticated recording/reproducing apparatus 20A, the upper limit of checkout count is checked.

For example, if only one checkout is permitted as the transfer handling rule for SDMI network content and the SDMI network content in question is found checked out in the past to the SDMI-compliant recording/reproducing apparatus 20B (unless this content has been checked in), then the transfer of this content to the authenticated recording/reproducing apparatus 20A is disabled.

If the transfer handling rule for the SDMI network content has been cleared, then the control signal attached to the SDMI network content is checked to see whether or not the MDOK flag is active (DP7 to DP9).

If the MDOK flag is found off, the transfer of this content is disabled (DP10).

If the MDOK flag is found active, it indicates that this SDMI network content can be transferred to the secondary recording medium side apparatus 20A. In this case, the content data are transferred on the transmission path in the encrypted state. In the recording/reproducing apparatus 20A, this network content is copied and recorded to the Mini Disc 100 in the decrypted state.

In this case, too, any content data that have been transferred once and then copied and recorded to the Mini Disc 100 cannot be checked in.

In this transfer processing example, the transfer of SDMI network content to the recording/reproducing apparatus 20A is permitted when the following conditions are satisfied; (1) the recording/reproducing apparatus 20A has been successfully authenticated, (2) the MDOK flag of the content data to be transferred is active (the transfer is authorized by the copyright holder), (3) check-in is disabled, and (4) the transfer handling rule for not identifying the destination apparatus of SDMI network content has been cleared. Then, the transfer to the recording/reproducing apparatus 10A is permitted and the SDMI network content can be copied and recorded to the Mini Disc 100 in the decrypted state.

Consequently, the same effect as with the above-mentioned first example of transfer processing can be obtained. At the same time, the upper limit of permitted copy count is not exceeded by means of the common transfer handling rule which does not identify connected apparatuses, so that the copyright protection capability becomes stronger than the first example of transfer processing.

In the above-mentioned first embodiment, the permitted copy count (the number of times checkout can be performed) of SDMI network content from the primary recording medium (HDD) to the secondary recording medium (Mini Disc) is not restricted. In the above-mentioned second embodiment, the MDOK flag is determined by checking the handling rule of SDMI network content, so that the permitted copy count of SDMI network content from the primary recording medium to the secondary recording medium can be restricted. Consequently, stricter copyright protection control can be performed than the first embodiment.

Third Example of Transfer Processing

Figure 8:
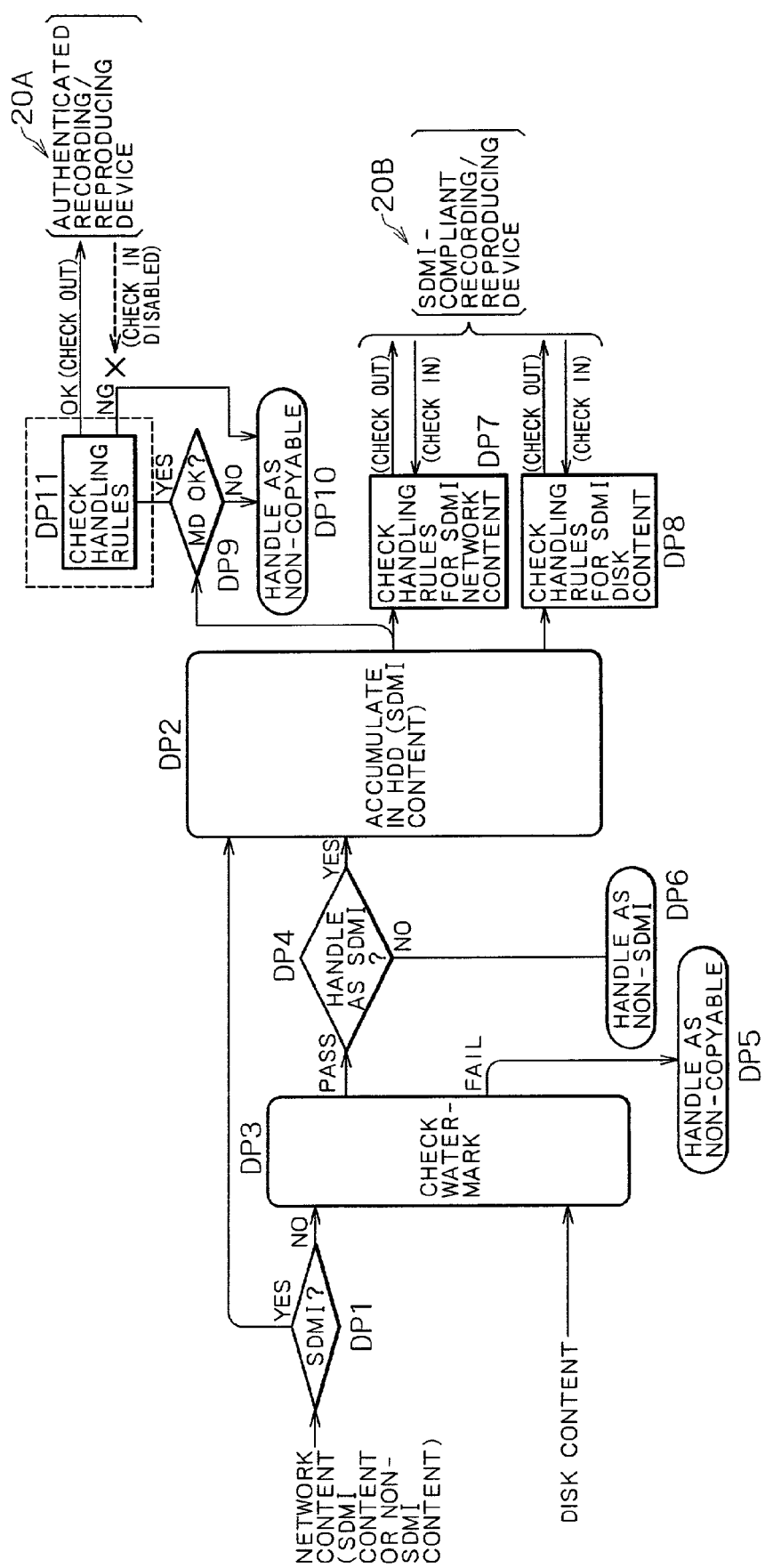
FIG. 8 illustrates the content flow and usage rule practiced as a third embodiment of the invention.

The following describes the third example of transfer processing with reference to the data path shown in FIG. 8. It should be noted that DP1 through DP8 are generally the same as shown in FIG. 6 and their descriptions will be skipped; only the case in which the authenticated recording/reproducing apparatus 20A is connected to the personal computer 1.

When the authenticated recording/reproducing apparatus 20A is connected to the connection section 11, the following processing is executed.

If the transfer of certain SDMI network content stored in the HDD 5 to the recording/reproducing apparatus 20A is requested, the control signal attached to this SDMI network content is checked to see whether or not the MDOK flag is active (DP9).

If the MDOK flag is found off, the transfer of this content is not permitted (DP9 to DP10).

If the MDOK flag is found active, then the transfer handling rule for the SDMI network content is checked (DP11). This check is performed independently of the transfer handling check of DP7 which is executed when the destination of connection is the SDMI-compliant recording/reproducing apparatus 20B. Namely, regardless of the checkout to the SDMI-compliant recording/reproducing apparatus 20B, the upper limit of permitted copy count is predetermined and the requested transfer is checked if it is within the determined upper limit.

If the requested transfer is found within the upper limit count, this transfer handling rule check is cleared; otherwise, the check is no good, thereby disabling the requested transfer (DP11 to DP10).

When the transfer handling rule check for the recording/reproducing apparatus 20A has been cleared for the SDMI network content, this SDMI network content can be transferred to the recording medium side apparatus 20A. In this case, the content data are transmitted on the transmission path in the encrypted state. In the recording/reproducing apparatus 20A, the content data are copied and recorded to the Mini Disc 100 in the decrypted state.

In this case, too, any content data that have been transferred once and then copied and recorded to the Mini Disc 100 cannot be checked in.

In this transfer processing example, the transfer of SDMI network content to the recording/reproducing apparatus 20A is permitted when the following conditions are satisfied; (1) the recording/reproducing apparatus 20A has been successfully authenticated, (2) the MDOK flag of the content data to be transferred is active (the transfer is authorized by the copyright holder), (3) check-in is disabled, and (4) the transfer handling rule for the case where the destination of SDMI network content data is the recording/reproducing apparatus 20A has been cleared. Then, the transfer to the recording/reproducing apparatus 10A is permitted and the SDMI network content can be copied and recorded to the Mini Disc 100 in the decrypted state.

Consequently, the same effect as with the case where the connected apparatus is the recording/reproducing apparatus 20A. At the same time, the transfer handling rule for the case where the connected apparatus is the recording/reproducing apparatus 20A is checked as one of the transfer permission conditions, so that the copyright protection capability is stronger than the first example of transfer processing but less strict than the second example of transfer processing. "Less strict" as used herein denotes that the authorized usage range of users is widened to some extent and does not denote that unauthorized copy activities are facilitated (at least, these activities are made more difficult by the copyright protection capability of the level of the first example of transfer processing).

Fourth Example of Transfer Processing

The following describes the fourth example of transfer processing with reference to the data path shown in FIG. 9. It should be noted that DP1 through DP8 are generally the same as shown in FIG. 6 and their descriptions will be skipped. The processing (DP9 and DP10) for transferring SDMI network content when the authenticated recording/reproducing apparatus 20A is connected to the personal computer 1 is the same as shown in FIG. 5.

In what follows, the handling of SDMI disk content will be described.

When the above-mentioned authenticated recording/reproducing apparatus 20A is connected to the connection section 11 and the processing of transferring certain SDMI disk content stored in the HDD 5 to the recording/reproducing apparatus 20A is requested, the transfer of this SDMI disk content to the recording/reproducing apparatus 20A is permitted. On the transmission path, the content data are transmitted in the encrypted state. In the recording/reproducing apparatus 20A, the content data are copied and recorded to the Mini Disc 100 in the decrypted state.

In this case, too, any content data that have been transferred once and then copied and recorded to the Mini Disc 100 cannot be checked in.

In this example of transfer processing, the transfer of SDMI disk content to the recording/reproducing apparatus 20A is permitted and the content data can be copied and recorded to the Mini Disc 100 when the following conditions are satisfied; (1) the recording/reproducing apparatus 20A has been successfully authenticated and (2) check-in is disabled.

Consequently, the usage range of the SDMI disk content can also be widened as copied to the Mini Disc 100. At the same time, the copyright protection capability can be secured by that the transfer destination apparatus is identified, check-in is disabled, and the transmission is made in the encrypted state.

In this example, the MDOK flag check is not performed unlike the foregoing examples. This is because the control information such as MDOK flag is not recorded to widely used CD-DA and others. Hence, the intent of the copyright holder is not reflected. However, this does not mean that the copyright protection capability of the fourth example of transfer processing is insufficient, because, as for digital copy, the copy count is controlled by the conventional SCMS (Serial Copy Management System).

In addition, the copyright protection capability for SDMI disk content can be further enhanced by performing the transfer handling rule check with the transfer destination not identified or by performing the transfer handling rule check with the recording/reproducing apparatus 20A being the transfer destination.

Thus, the preferred embodiments of the present invention have been described by way of example. It will be apparent that the present invention is not limited to these examples.

For example, the data transfer processing operations mentioned above are applicable to not only SDMI content but also various other data which require copyright protection.

The primary recording medium is not only the HDD but also many other storage devices.

It will also be apparent that the secondary recording medium and the secondary recording medium side apparatus 20A are not only the Mini Disc and the Mini Disc player, but also various other devices. The secondary recording medium 100 may also be CD-R, CD-RW, DVD-RAM, DVD-R, DVD-RW, or memory card. Therefore, the secondary recording medium side apparatus 20A may be any recording device that is compatible with these recording media.

In the foregoing description, the secondary recording medium side apparatus is connected to the personal computer, which is the primary recording medium side apparatus, in a wired or wireless manner and copyrighted content data are transmitted in this configuration. It will be apparent that the personal computer, which is the primary recording medium side apparatus, may be arranged with a slot for loading the secondary recording medium (MD, CD-R, or others) not compliant with SDMI, thereby copying copyrighted content data without using the secondary recording medium side apparatus.

In the above-mentioned embodiments, the check-in from the secondary recording medium to the primary recording medium is disabled from the personal computer. It will be apparent that this disablement may be controlled from the secondary recording medium recording/reproducing apparatus.

As described and according to the invention, the transfer of content data stored in the primary recording medium in the data transfer apparatus as the content data to be copyright-protected such as SDMI content for example to the data recording apparatus is permitted if conditions such as the successful authentication of the data recording apparatus connected to the data transfer apparatus and the prohibition of the check-in from the data recording apparatus. Further, the transfer to the data recording apparatus is permitted if the provider (copyright holder or server) of SDMI content permits the transfer. Still further, the transfer to the data recording apparatus is permitted if the transfer permission condition specifying the upper limit of permitted copy transfer count is satisfied. The data recording apparatus records the received content data to the secondary recording medium in the decrypted state.

Consequently, the secondary recording medium (for example, Mini Disc) recorded with content data can be played back by conventional players, thereby removing the unnecessary restrictions to the usage of content. This eventually enhances the serviceability to general users.

The permission of content transfer and copy under these conditions prevents the unconditional, unauthorized copy of content from taking place. All content data on the transmission paths are encrypted. These novel configurations contribute to the protection of the copyright of content.

While the preferred embodiments of the present invention have been described using specific terms, such description is for illustrative purposes only, and it is to be understood that changes and variations may be made without departing from the spirit or scope of the appended claims.

What is claimed is:

1. A data transfer apparatus comprising:

transfer means for transferring content data encrypted in a predetermined manner from a first recording means which can store encrypted content data to a first external apparatus and a second external apparatus;

discrimination means for making discrimination between said first external apparatus which can record only encrypted content data to a second recording means accommodated in said first external apparatus connected to said data transfer apparatus and said second external apparatus which can record only decrypted content data to a third recording means accommodated in said second external apparatus connected to said data transfer apparatus; and if said first external apparatus is discriminated by said discrimination means, control means for decrementing a transfer count of the encrypted content data when transferring said encrypted content data from said first recording means to said first external apparatus, incrementing said transfer count when said encrypted content data are returned from said first external apparatus, and disabling the transfer of said content data from said first recording means to said first external apparatus if said transfer count has exceeded a predetermined limit value and, if said second external apparatus is determined by said discrimination means, said control means disabling the return of the encrypted content data from said second external apparatus.

2. The data transfer apparatus according to claim 1, wherein said second recording means accommodated in said first external apparatus is a flash memory.

3. The data transfer apparatus according to claim 1, wherein said third recording means accommodated in said second external apparatus is a magneto-optical disk.

4. The data transfer apparatus according to claim 1, wherein said first recording means is a hard disk.

5. The data transfer apparatus according to claim 1, wherein said second external apparatus has decryption means for decrypting the encrypted content data transferred from said data transfer apparatus, recording the content data decrypted by said decryption means into said third recording means.

6. The data transfer apparatus according to claim 1, further comprising:

first receiving means for receiving the encrypted content data and a control signal from a content server;

second receiving means for receiving unencrypted content data from a package medium; and if said second external apparatus is discriminated by said discrimination means, determination means for determining whether or not to transfer said content data from said content server on the basis of said control signal attached to said content data supplied from said content server.

7. The data transfer apparatus according to claim 6, wherein said control means restricts the transfer count of said content data supplied from said content server, said content data being transferred from said first recording means to said second external apparatus.

8. The data transfer apparatus according to claim 1, further comprising:

first receiving means for receiving encrypted content data and a control signal supplied from a content server;

second receiving means for receiving unencrypted content data supplied from a package medium; and encryption means for encrypting said unencrypted content data supplied from said package medium and received by said second receiving means;

if said second external apparatus is discriminated by said discrimination means, transferring the content data encrypted by said encryption means to said second external apparatus.

9. A data transfer system having a data transfer apparatus and at least one of a first external apparatus and a second external apparatus which can be selectively connected to said data transfer apparatus, said data transfer apparatus comprising:

transfer means for transferring content data encrypted in a predetermined manner from a first recording means which can store encrypted content data to said first external apparatus and said second external apparatus;

discrimination means for making discrimination between said first external apparatus which can record only encrypted content data to a second recording means accommodated in said first external apparatus connected to said data transfer apparatus and said second external apparatus which can record only decrypted content data to a third recording means accommodated in said second external apparatus connected to said data transfer apparatus; and if said first external apparatus is discriminated by said discrimination means, control means for decrementing a transfer count of the encrypted content data when transferring said encrypted content data from said first recording means to said first external apparatus, incrementing said transfer count when said encrypted content data are returned from said first external apparatus, and disabling the transfer of said content data from said first recording means to said first external apparatus if said transfer count has exceeded a predetermined limit value and, if said second external apparatus is discriminated by said discrimination means, said control means disabling the return of the encrypted content data from said second external apparatus;

said second external apparatus comprising:

receiving means for receiving the content data encrypted in a predetermined manner from said transfer means;

decryption means for decrypting said content data encrypted in a predetermined manner received by said receiving means;

and recording means for recording said content data decrypted by said decryption means into said third recording means.

10. The data transfer system according to claim 9, wherein said second recording means accommodated in said first external apparatus is a flash memory.

11. The data transfer system according to claim 9, wherein said third recording means accommodated in said second external apparatus is a magneto-optical disk.

12. The data transfer system according to claim 9, wherein said first recording means is a hard disk.

13. The data transfer system according to claim 9 wherein said second external apparatus has decryption means for decrypting the encrypted content data transferred from said data transfer apparatus, recording the content data decrypted by said decryption means into said third recording means.

14. The data transfer system according to claim 9, further comprising:

first receiving means for receiving the encrypted content data and a control signal from a content server;

second receiving means for receiving unencrypted content data from a package medium; and if said second external apparatus is discriminated by said discrimination means, determination means for determining whether or not to transfer said content data from said content server on the basis of said control signal attached to said content data supplied from said content server.

15. The data transfer system according to claim 14, wherein said control means restricts the transfer count of said content data supplied from said content server, said content data being transferred from said first recording means to said second external apparatus.

16. The data transfer system according to claim 9, wherein said data transfer apparatus further comprises:

first receiving means for receiving encrypted content data and a control signal supplied from a content server;

second receiving means for receiving unencrypted content data supplied from a package medium; and encryption means for encrypting said unencrypted content data supplied from said package medium and received by said second receiving means;

if said second external apparatus is discriminated by said discrimination means, transferring the content data encrypted by said encryption means to said second external apparatus.

17. A data transfer method for transferring encrypted content data from a data transfer apparatus having a first memory which can store encrypted content data to a second memory accommodated in a first external apparatus connected to said data transfer apparatus and a third memory accommodated in a second external apparatus connected to said data transfer apparatus, said data transfer method comprising:

discriminating between said first external apparatus which can record only encrypted content data to said second memory and said second external apparatus which can record only decrypted content data to said third memory;

if said first external apparatus is discriminated, decrementing a transfer count of the encrypted content data when transferring said encrypted content data from said first memory to said first external apparatus, incrementing said transfer count when said encrypted data are returned from said first external apparatus, and disabling the transfer of said content data from said first memory to said first external apparatus if said transfer count has exceeded a predetermined limit value; and if said second external apparatus is discriminated, disabling the return of the encrypted content data from said second external apparatus.

18. The data transfer method according to claim 17, wherein said second memory accommodated in said first external apparatus is a flash memory.

19. The data transfer method according to claim 17, wherein said third memory accommodated in said second external apparatus is a magneto-optical disk.

20. The data transfer method according to claim 17, wherein said first memory is a hard disk.

21. The data transfer method according to claim 17, wherein, if the encrypted content data to be stored in said first memory are supplied via a network, control information is attached to said encrypted content data and stored in said first memory, said data transfer method further comprising:

judging whether there is said control information when transferring said encrypted content data from said first memory to said second external apparatus; and if said second external apparatus has been discriminated, determining whether to transfer said content data supplied from said content server depending on the presence of said control information.

22. The data transfer method according to claim 21, further comprising:

restricting a transfer count in which said content data supplied from said content server can be transferred from said first memory of said data transfer apparatus to said second external apparatus.

23. The data transfer method according to claim 17, wherein, if encrypted content data to be stored in said first memory are supplied from a package medium and said second external apparatus has been discriminated, said encrypted content data are supplied to said second external apparatus.

24. A data recording apparatus which receives encrypted content data from a data transfer apparatus having a first recording medium storing said encrypted content data and records the received encrypted content data to a second recording medium, comprising:

communication means for performing bidirectional communication with said data transfer apparatus;

authentication processing means for performing authentication with said data transfer apparatus through said communication means;

decryption means for decrypting said encrypted content data supplied from said data transfer apparatus through said communication means;

recording means for recording said content data decrypted by said decryption means to said second recording medium; and control means for disabling the return of said content data from said second recording medium to said data transfer apparatus through said communication means.

25. A recording medium storing a computer-readable program for transferring encrypted content data from a data transfer apparatus having a first memory storing said encrypted content data to a second memory accommodated in a first external apparatus connected to said data transfer apparatus and a third memory accommodated in a second external apparatus connected to said data transfer apparatus, said computer-readable program comprising:

discriminating between said first external apparatus which can record only encrypted content data to said second memory and said second external apparatus which can record only decrypted content data to said third memory;

if said first external apparatus is discriminated, decrementing a transfer count of the encrypted content data when transferring said encrypted content data from said first memory to said first external apparatus, incrementing said transfer count when said encrypted data are returned from said first external apparatus, and disabling the transfer of said content data from said first memory to said first external apparatus if said transfer count has exceeded a predetermined limit value; and if said second external apparatus is discriminated, disabling the return of the encrypted content data from said second external apparatus.

* * * * *